UNITED STATES PATENT OFFICE.

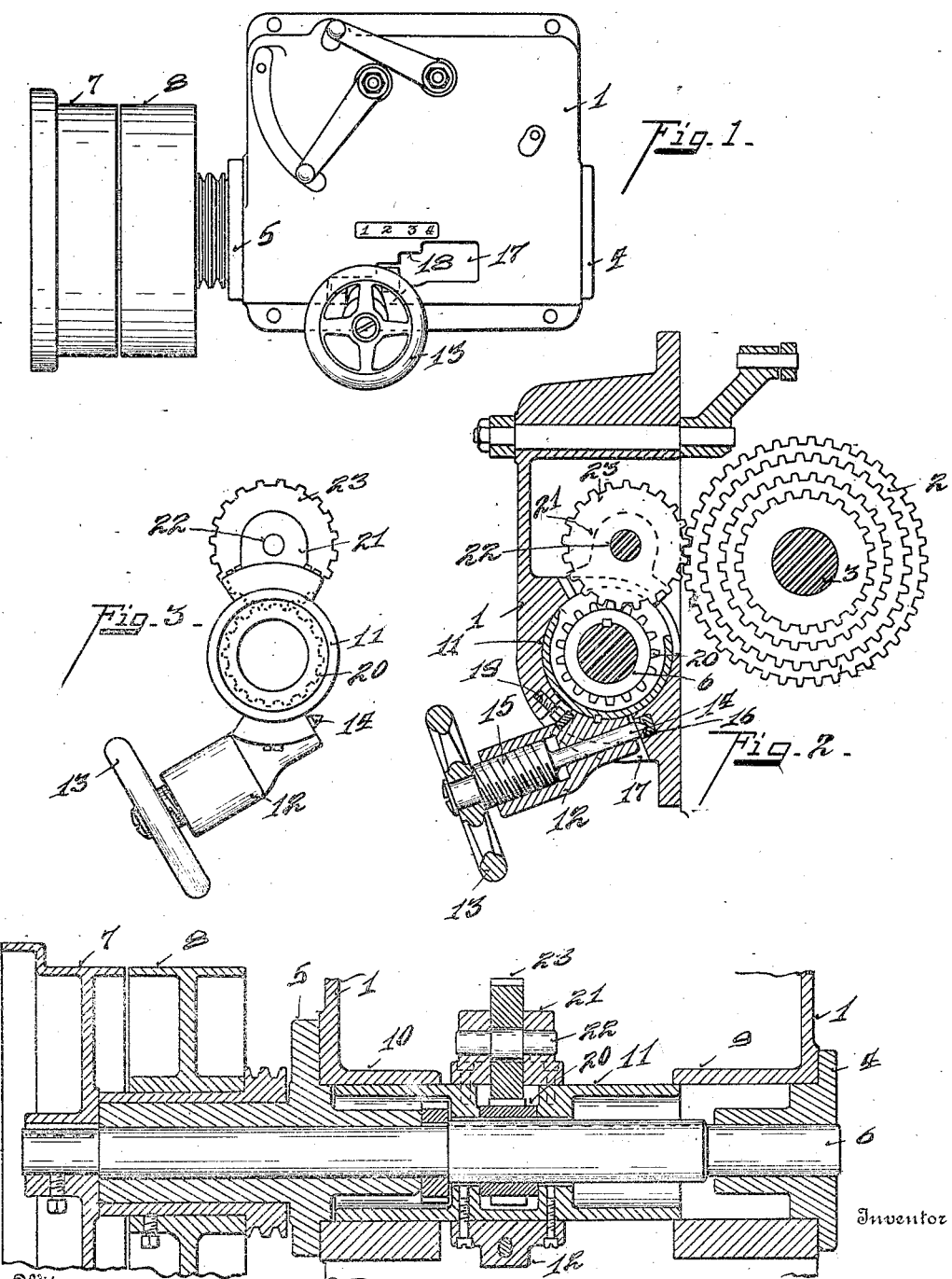

ADOLPH L. DE LEEUW, OF HAMILTON, OHIO, ASSIGNOR TO THE CINCINNATI MILLING MACHINE COMPANY, OF CINCINNATI, OHIO, A CORPORATION OF OHIO.

VARIABLE-SPEED MECHANISM.

No. 914,643.     Specification of Letters Patent.     Patented March 9, 1909.

Application filed November 21, 1908. Serial No. 463,834.

*To all whom it may concern:*

Be it known that I, ADOLPH L. DE LEEUW, a citizen of the United States, residing at Hamilton, in the county of Butler and State of Ohio, have invented certain new and useful Improvements in Variable-Speed Mechanism, of which the following is a specification.

My invention relates to a variable speed mechanism primarily of the cone and tumbler type.

One of the objects of my invention is to provide a tumbler lever with means for mounting the same within its supporting frame independent of the bearings of the shaft relative to which it slides and substantially free from contact with the shaft.

Another object of my invention is to provide the tumbler lever with locking means for rigidly locking the same in any of its various step positions by a manipulating handle.

Another object of my invention is to provide a tumbler lever with elongated sleeve projections, enabling the same to be constantly supported in stationary and rigid bearings, irrespective of any position of its lateral adjustment.

The various features of my invention are more fully set forth in the description of the accompanying drawings, forming a part of this specification, in which:—

Figure 1 is a front elevation of casing and manipulation lever. Fig. 2 is an enlarged section on line *x, x*, Fig. 1. Fig. 3 is a detail side elevation of the tumbler lever. Fig. 4 is a central vertical section through Fig. 1.

1 represents the frame which is attached to a machine tool, relatively to a cone of gears 2, fixed to a shaft 3 suitably journaled within the machine tool frame, or otherwise, as the case may be to which my invention is applied.

4, 5, represent bearing plates fixed to frame 1, provided with sleeve projections and within which the driving shaft 6 journals.

7 represents a pulley fixed to the shaft 6 for driving the same. The frame 1 is provided with the sleeve projections 9, 10, forming bearings for the tumbler lever sleeve 11.

12 represents a sleeve plate fixed to the sleeve 11, forming a lever projection for shifting the sleeve and tumbler gearing.

13 represents a hand wheel provided with the stem 14, a portion 15 of which is screw threaded having screw threaded engagement with the sleeve 12 and its free end projecting through the sleeve and adapted to engage notches 16 formed in the frame 1. A series of these notches are provided and arranged in step form relatively to the number of gears or steps of the cone of gears 2. The casing or frame 1 is provided with the opening 17, through which the tumbler lever projects and with the steps 18, according to the number of gears of the cone. These steps are also preferably provided with screws 19 forming abutments against which the tumbler lever is locked.

20 represents a gear splined upon shaft 6, the hub of which on each side engages with the inwardly projecting ribs formed integral with the sleeve 11, whereby the gear is laterally shifted with the sleeve.

21 represents a bearing plate fixed to the periphery of the sleeve 11 forming a bearing for the tumbler shaft 22.

23 represents the tumbler or intermediate gear in mesh with the gear 20 and adapted to be thrown into mesh with any one of the gears and locked in such position by the hand wheel 13. To mesh the tumbler gear 23 with any one of the gears of the cone 2, the hand wheel 13 is turned in a direction to release and free the same from the notches 16 permitting the tumbler lever to be shifted laterally to the right or left to aline the tumbler gear with a selected gear of the cone, at the same time permitting a rocking of the tumbler lever and sleeve 11 to properly mesh the gears, after which the hand wheel is turned to bring the stem into engagement with the particular notch, securely locking the tumbler lever in position, preventing longitudinal and rocking movement of the tumbler lever. The screws 19 form abutments against which the tumbler lever is locked and are set to a position which will permit of the proper intermesh of tumbler gear with the gears of the cone. By this locking mechanism the tumbler gear is firmly held in position against rocking. It will also be seen that the driving shaft 6 is substantially free from contact with the sleeve 11 of the tumbler lever, the shaft and tumbler lever each having independent bearings eliminating all tumbler strains from the shaft. Again, the sleeve and its bearings are of such size as to support the tumbler lever upon each side irrespective of the position to which it is shifted, thereby preventing any strain on the driving shaft through the tumbler gears, and also serving to prevent lateral strain upon the tumbler gear. By this elongated bearing of the tumbler lever and locking mechanism, the tumbler lever when clamped in position practically forms a part of the rigid frame or casing structure with the strains entirely borne by the frame.

Having described my invention, I claim:—

1. In a cone and tumbler variable speed gear mechanism, a frame, a sliding tumbler pivotally supported in said frame, a series of abutments adapted to be engaged by the tumbler in its respective positions of gear intermesh, and means for clamping the tumbler against said abutments, substantially as described.

2. In a cone and tumbler variable speed mechanism, a frame, a tumbler supported in said frame having pivotal and sliding action therein, and a manipulator for said tumbler, adapted to slide, rock and lock the same in various positions, substantially as described.

3. In a cone and tumbler variable speed mechanism, a frame, a tumbler journaled in said frame, a shaft projected axially through said tumbler and substantially free from contact with said tumbler and supported in bearings independent of the tumbler bearings, a gear carried by said tumbler and driven by said shaft, substantially as described.

4. In a cone and tumbler variable speed mechanism, a frame, a tumbler supported in said frame, having pivotal and sliding connection therein, a manipulator for said tumbler adapted to slide, rock and lock the same in various positions of gear intermesh, a shaft projected axially through said tumbler and substantially free from contact with said tumbler and supported in bearings independent of the tumbler bearings, a gear carried by said tumbler and driven by said shaft, substantially as described.

5. In a cone and tumbler variable speed mechanism, a frame, a tumbler provided with an elongated axial sleeve pivotally and slidably supported in said frame, whereby the sleeve is maintained in its bearings upon both sides of the tumbler irrespective of its sliding action, substantially as described.

6. In a cone and tumbler variable speed gear mechanism, a frame, a sliding tumbler pivotally supported in said frame, a series of step abutments formed in said frame adapted to be engaged by said tumbler in its respective positions of gear intermesh, means for clamping the tumbler against said abutments, said frame being formed with a series of notches respectively opposite said abutments adapted to be engaged by said clamping means, substantially as described.

7. In a cone and tumbler variable speed mechanism, a frame, a tumbler provided with an elongated axial sleeve pivotally and slidably supported in said frame at each end irrespective of the length of sliding movement, a shaft projected through said sleeve and substantially free from contact therewith and journaled in bearings independent of the tumbler bearings, a gear carried by said tumbler and driven by said shaft, substantially as described.

8. In a cone and tumbler variable speed gear mechanism, a frame, a tumbler provided with an elongated axial sleeve pivotally and slidably supported in said frame at each end irrespective of the length of sliding movement, a shaft projected through said sleeve and substantially free from contact therewith and journaled in bearings independent of the tumbler bearings, a gear carried by said tumbler and driven by said shaft, a series of abutments adapted to be engaged by the tumbler in its respective positions of gear intermesh, and means for clamping the tumbler against said abutments, substantially as described.

9. In a variable speed mechanism, a frame, a tumbler rocking and sliding in bearings formed in the frame, substantially as described.

In testimony whereof, I have hereunto set my hand.

ADOLPH L. DE LEEUW.

Witnesses:
OLIVER B. KAISER,
L. BECK.